(No Model.)

F. W. REDEL.
LAWN MOWER ATTACHMENT.

No. 463,451.  Patented Nov. 17, 1891.

WITNESSES
Geo. E. Frech.
Roland H. Fitzgerald.

INVENTOR
Francis W. Redel
per
Lehmann Pattison
attys

THE NORRIS PETERS CO., PHOTO-LITHO., WASHINGTON, D. C.

United States Patent Office.

FRANCIS W. REDEL, OF COLUMBUS, OHIO.

LAWN-MOWER ATTACHMENT.

SPECIFICATION forming part of Letters Patent No. 463,451, dated November 17, 1891.

Application filed July 2, 1891. Serial No. 398,294. (No model.)

*To all whom it may concern:*

Be it known that I, FRANCIS W. REDEL, of Columbus, in the county of Franklin and State of Ohio, have invented certain new and useful Improvements in Lawn-Mower Attachments; and I do hereby declare the following to be a full, clear, and exact description of the invention, such as will enable others skilled in the art to which it pertains to make and use it, reference being had to the accompanying drawings, which form part of this specification.

My invention relates to an improvement in lawn-mower attachments; and it consists in certain novel features of construction which will be fully described hereinafter, and more particularly referred to in the claims.

The object of my invention is to construct an improved grass-carrying attachment for lawn-mowers.

Figure 1:
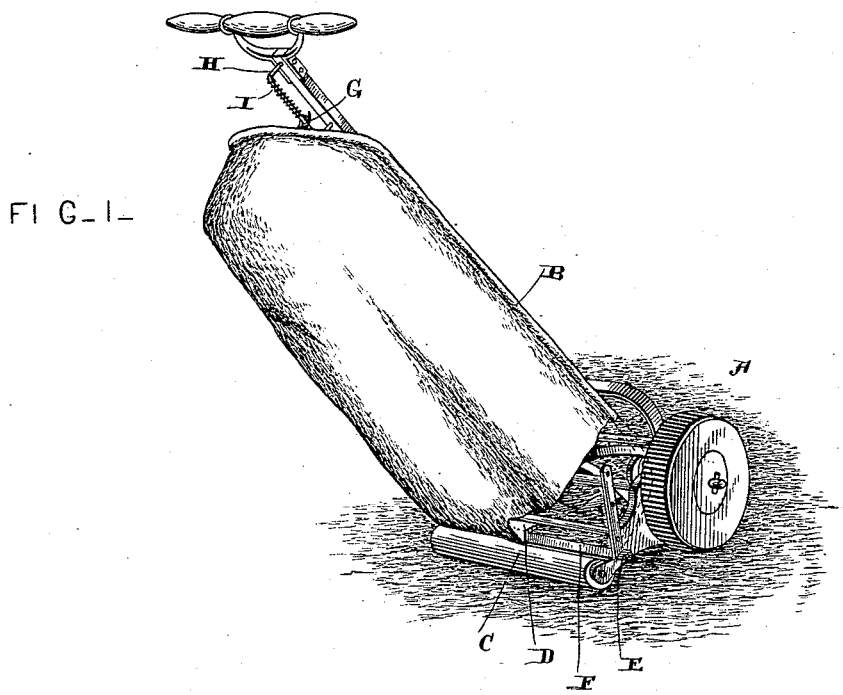
Figure 2:
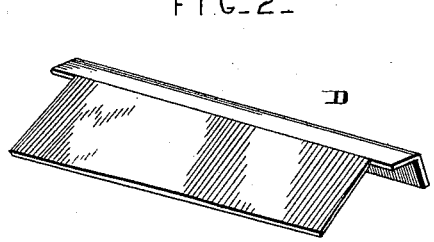
Figure 3:
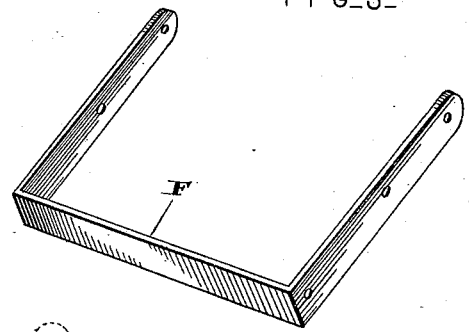
Figure 4:
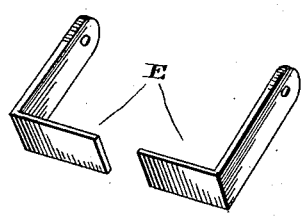
Figure 5:
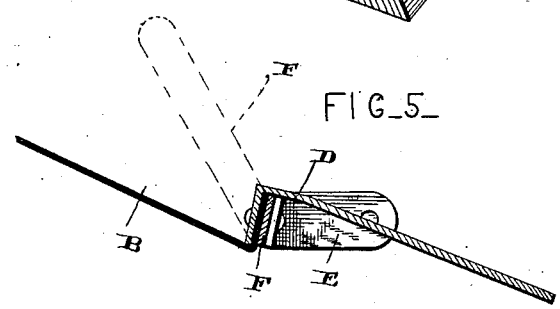

Referring to the accompanying drawings, Figure 1 is a perspective view of a lawn-mower provided with my improved attachment. Figs. 2, 3, 4, and 5 are detached views of the parts for clamping the lower portion of the grass-receptacle.

A represents a lawn-mower of the ordinary construction, and B a grass-receptacle which is secured thereto. Extending back over the roller C is the plate D, which is secured to the frame of the mower by suitable ears E. The rear edge of this plate is turned down, and to the under side of this turned-down portion is secured the lower end of the bag or receptacle B by means of the yoke or clamp F. The ends of this clamp are turned upward and outward, and to them are secured the sides of the bag in any suitable manner, thereby bracing or stiffening the bag and at the same time spreading it, so as to catch the grass as it flies back from the knives of the mower. The rivets which secure the yoke F to the turned-down edge of the plate D also pass through the inturned ends of the ears E, so that the whole of the lower portion is secured together in a most durable manner.

The upper end of the grass-receptacle is secured to the under side of the handle of the mower by means of an eye G and staple H, as shown in Fig. 1. The eye may be secured to the outer end of the bag in any suitable manner. Placed upon this staple is the coiled spring I, which is secured at one end to the outer end of the staple and connected at its free end to the eye G. By this means the eye is given a compensating movement on the staple H, thus relieving the strain on the bag B when it is heavily loaded with grass.

The bag B may be constructed of any suitable material and is provided with a stiffening-wire around its edge, whereby it may be given any desired shape.

By constructing an attachment as herein described it is securely held in place, and at the same time the bag is not subjected to the strain of a heavy load, as it would be were it rigidly connected to the handle.

Having thus described my invention, I claim—

1. In a lawn-mower attachment, a plate secured to the mower having a turned-down edge, a yoke having a horizontal portion for clamping the lower end of the receptacle to the said turned-down edge, the ends of the yoke turned upward and outward for bracing the sides of the receptacle, and means for securing the upper end of the receptacle to the handle of the mower, the parts being combined substantially as shown and described.

2. In a lawn-mower attachment, a grass-receptacle secured to the machine at its lower end and a yielding connection between the upper end of the receptacle and the handle of the machine, for the purpose substantially as herein shown and described.

3. In a lawn-mower attachment, the grass-receptacle secured at its lower end to the machine and at its upper end provided with an eye, a staple on which it moves, and a spring on the said staple which is connected to the eye, for the purpose substantially as shown and described.

In testimony whereof I affix my signature in presence of two witnesses.

FRANCIS W. REDEL.

Witnesses:
 PAUL JONES,
 J. S. GOLD.